(12) United States Patent
Kaimer et al.

(10) Patent No.: US 12,132,237 B2
(45) Date of Patent: Oct. 29, 2024

(54) FUEL CELL MOTOR VEHICLE AND METHOD

(71) Applicant: FORD GLOBAL TECHNOLOGIES, LLC, Dearborn, MI (US)

(72) Inventors: Stefan Kaimer, Aachen (DE); Hans Guenter Grosch, Vettweiss (DE); Julio Orozco Santos Coy, Aachen (DE); Rolf Lorenz Loeffler, Rommerskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/521,125

(22) Filed: Nov. 8, 2021

(65) Prior Publication Data

US 2022/0149402 A1    May 12, 2022

(30) Foreign Application Priority Data

Nov. 11, 2020  (DE) .......................... 102020214166.5

(51) Int. Cl.
*H01M 8/04746* (2016.01)
*H01M 8/04119* (2016.01)
*H01M 8/249* (2016.01)

(52) U.S. Cl.
CPC ... *H01M 8/04776* (2013.01); *H01M 8/04141* (2013.01); *H01M 8/249* (2013.01); *H01M 2250/20* (2013.01)

(58) Field of Classification Search
CPC .......................... H01M 8/249; H01M 8/04776
See application file for complete search history.

(56) References Cited

U.S. PATENT DOCUMENTS

| | | | |
|---|---|---|---|
| 2005/0064269 A1 | 3/2005 | Kurtz et al. | |
| 2007/0099037 A1 | 5/2007 | Senner | |
| 2008/0182148 A1* | 7/2008 | Skala | H01M 8/249 429/454 |
| 2009/0269637 A1 | 10/2009 | Darga et al. | |
| 2010/0291447 A1* | 11/2010 | Imanishi | H01M 8/04559 429/429 |
| 2021/0036351 A1* | 2/2021 | Nakajima | H01M 8/0494 |

FOREIGN PATENT DOCUMENTS

| | | |
|---|---|---|
| DE | 102012007382 A1 | 10/2013 |
| WO | 2020018832 A1 | 1/2020 |

OTHER PUBLICATIONS

Examination Report DE 10 2020 214 166.5 Filed Aug. 2, 2021, 9 pages.

* cited by examiner

*Primary Examiner* — Brian R Ohara
(74) *Attorney, Agent, or Firm* — Brooks Kushman PC; David B. Kelley

(57) ABSTRACT

A fuel cell vehicle includes a fuel cell assembly with at least a first fuel cell stack and a second fuel cell stack. Waste gas extracted from the first fuel cell stack is routed to an input of the second fuel cell stack. The first and second fuel cell stacks may be of the same size or the second fuel cell stack may be sized smaller than the first fuel cell stack.

8 Claims, 6 Drawing Sheets

FUEL CELL MOTOR VEHICLE AND METHOD

CROSS-REFERENCE TO RELATED APPLICATIONS

This application claims foreign priority benefits under 35 U.S.C. § 119(a)-(d) to DE Application 10 2020 214 166.5 filed Nov. 11, 2020, which is hereby incorporated by reference in its entirety.

TECHNICAL FIELD

This disclosure relates to a fuel cell motor vehicle and method.

BACKGROUND

In a fuel cell motor vehicle, electrical energy is generated by a fuel cell from hydrogen or methanol as energy sources and is converted directly into kinetic energy by the electric drive or temporarily stored in a traction battery.

US 2005/0064269 A1 and WO 2020/018832 A1 each disclose fuel cell assemblies having at least one fuel cell stack.

Fuel cells are operated with a stoichiometric ratio greater than 1, i.e. with an excess of reactants, leading to a nonoptimal utilization of the fed in reactants. Such fuel cell stacks are limited in terms of their power. For higher power outputs, a plurality of fuel cell stacks must be combined in a fuel cell assembly. In addition to the fuel cell stacks, however, this requires the provision of more powerful or additional components (balance of plant—BOP), in particular compressors and/or humidifiers, which are required for operation of the fuel cell stacks.

SUMMARY

A fuel cell vehicle and a method fur operating a fuel cell vehicle having a fuel cell assembly with at least one first fuel cell stack and one second fuel cell stack include extracting waste gas from the first fuel cell stack and feeding the extracted waste gas to the second fuel cell stack.

The second fuel cell stack is thus at least partially and/or temporarily supplied with waste gas from the first fuel cell stack. This makes it possible to dimension a compressor and a humidifier which are assigned to the second fuel cell stack to be smaller than the compressor and the humidifier which are assigned to the first fuel cell stack.

According to one embodiment, the first fuel cell stack and the second fuel cell stack are of the same size. It is thus possible to use identical components for the two fuel cell stacks. This also enables the first fuel cell stack and the second fuel cell stack to be operated independently of one another.

According to a further embodiment, a compressor and/or humidifier assigned to the second fuel cell stack are/is of smaller dimensions than the compressor and/or humidifier assigned to the first fuel cell stack. It is thus possible to use components with a lower installation space requirement and/or a lower energy requirement. This also enables the first fuel cell stack and the second fuel cell stack to be operated independently of one another.

According to a further embodiment, the extracted waste gas is fed on the inlet side to a compressor assigned to the second fuel cell stack. For this purpose, a valve is arranged between an outlet of the first fuel cell stack and an inlet of the second fuel cell stack, by means of which valve a line connecting this inlet and outlet can be opened. It is thus a particularly simple matter to supply the second fuel cell stack at least partially and/or temporarily with waste gas from the first fuel cell stack. This also enables the first fuel cell stack and the second fuel cell stack to be operated independently of one another.

According to a further embodiment, a pressure distribution valve is provided on the outlet side on a compressor assigned to the first fuel cell stack. With the pressure distribution valve, both the first fuel cell stack and the second fuel cell stack can be supplied with air or oxygen at a respective pressure. This also enables the first fuel cell stack and the second fuel cell stack to be operated independently of one another.

According to a further embodiment, a compressor which is assigned to the first fuel cell stack and has two pressure outlets is provided. Thus, only a single compressor is necessary, reducing the number of components required. Flow distribution is achieved by means of two throttle valves, which are assigned on the input side to the respective humidifier of the respective fuel cell stack. This also enables the first fuel cell stack and the second fuel cell stack to be operated independently of one another.

According to a further embodiment, the first fuel cell stack and the second fuel cell stack are of different sizes. This allows both fuel cell stacks to be operated with just a single compressor and just a single humidifier. However, this does not enable the first fuel cell stack and the second fuel cell stack to be operated independently of one another.

According to a further embodiment, the extracted waste gas is fed to the second fuel cell stack via a valve. For this purpose, a valve is arranged between an outlet of the first fuel cell stack and an inlet of the second fuel cell stack, by means of which valve a line connecting this inlet and outlet can be opened. It is thus a particularly simple matter to supply the second fuel cell stack at least partially and/or temporarily with waste gas from the first fuel cell stack. However, this does not enable the first fuel cell stack and the second fuel cell stack to be operated independently of one another.

According to a further embodiment, humidified air or oxygen can be fed to the first fuel cell stack and/or to the second fuel cell stack via a further valve. For this purpose, a further valve is provided, which enables the second fuel cell stack to be supplied directly with compressed air. Furthermore, this enables waste gas from the second fuel cell stack to be passed together with waste gas from the first fuel cell stack through a humidifier which is assigned to the first fuel cell stack. This also enables the first fuel cell stack and the second fuel cell stack to be operated independently of one another.

DETAILED DESCRIPTION

Detailed embodiments of the present invention are disclosed herein. However, it is to be understood that the disclosed embodiments are merely examples of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
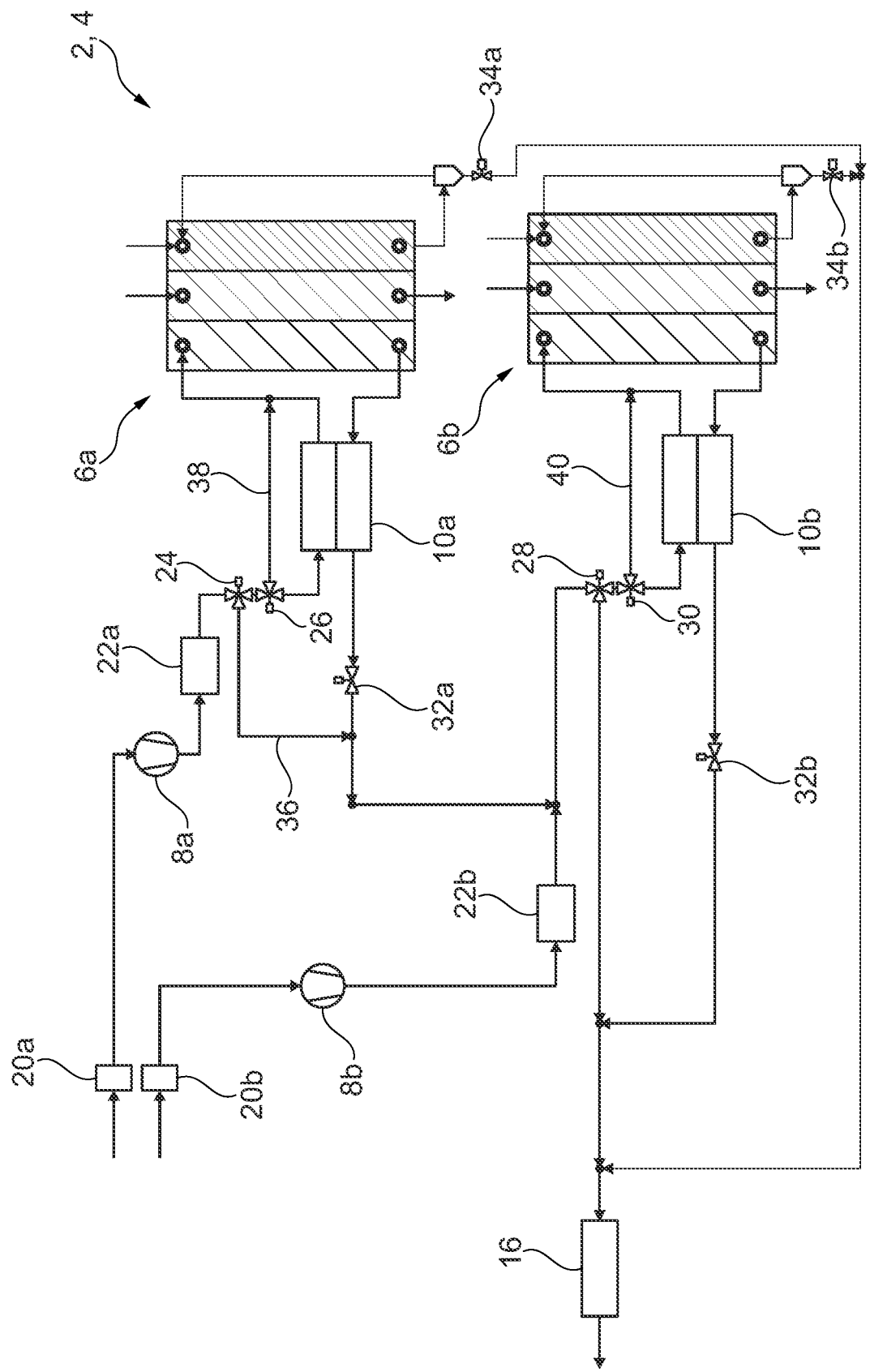
FIG. 1 shows a schematic representation of one embodiment of a fuel cell assembly for a fuel cell motor vehicle.

As shown in the representative embodiment of FIG. 1, a fuel cell assembly 4 for a fuel cell motor vehicle 2 has a first fuel cell stack 6a and a second fuel cell stack 6b for this purpose. Those of ordinary skill in the art will recognize that the fuel cell assembly 4 can also have further fuel cell stacks. The first fuel cell stack 6a and the second fuel cell stack 6b are of the same size.

Further illustrated components in the balance of plant (BOP) of the fuel cell assembly 4 include two compressors 8a, 8b, two humidifiers 10a, 10b, two filters 20a, 20b, two coolers 22a, 22b, which are water-cooled in the embodiment illustrated, in each case two valves 24, 26 and 28, 30, two throttle valves 32a, 32b and two hydrogen purge valves 34a, 34b.

In addition or as an alternative to the throttle valves 32a, 32b, turbines can also be provided. In this arrangement, one of the components is assigned to each of the two fuel cell stacks 6a, 6b. In other words, the first fuel cell stack 6a has a compressor 8a, humidifier 10a, etc., assigned to it. Likewise, the second fuel cell stack 6b has a compressor 8b, humidifier 10b, etc., assigned to it.

During operation, air or oxygen is fed to the first fuel cell stack 6a in its flow direction via the filter 20a, the compressor 8a and the water-cooled cooler 22a and the humidifier 10a. Air or oxygen which has flowed through the first fuel cell stack 6a is passed through the humidifier 10a, wherein a throttle valve 32a is arranged downstream of the humidifier 10a for control purposes. By means of a valve 24, it is possible to open a first bypass 36, with which the humidifier 10a, the first fuel cell stack 6a and the throttle valve 32a can be bypassed.

By means of a valve 26, which in the embodiment of FIG. 1 is arranged downstream of the valve 24, it is possible to open a second bypass 38, with which the humidifier 10a can be bypassed. To purge the first fuel cell stack 6a, a hydrogen purge valve 34a is provided, by means of which a connection to an outlet 16 can be established.

Similarly, air or oxygen is fed to the second fuel cell stack 6b in its flow direction via the filter 20b, the compressor 8b and the water-cooled cooler 22b and the humidifier 10b. Here too, air or oxygen that has flowed through the second fuel cell stack 6b is passed through the humidifier 10b, wherein a throttle valve 32b is arranged downstream of the humidifier 10b for control purposes.

By means of a further valve 28, air or oxygen which has flowed through the water-cooled cooler 22b, or the waste gas from the first fuel cell stack 6a, can be fed to the second fuel cell stack 6b or a connection to the outlet 16 can be established. By means of a further valve 30 arranged downstream of the valve 28, it is possible to open a third bypass 40, with which the humidifier 10b can be bypassed. To purge the second fuel cell stack, 6b, a hydrogen purge valve 34b is provided, by means of which a connection to the outlet 16 can be established.

The first bypass 36 extends from the valve 24 to the further valve 28, i.e. in the embodiment of FIG. 1, it opens downstream of the water-cooled cooler 22b into a supply line which connects the filter 20b, the compressor 8b and the water-cooled cooler 22b.

During operation, in a first step, waste gas from the first fuel cell stack 6a can be extracted, and in a second step, the extracted waste gas can be fed to the second fuel cell stack 6b. The extracted waste gas flows through the humidifier 10a, the throttle valve 32a, and the further valves 28, 30, and is then passed via the humidifier 10b and/or directly into the second fuel cell stack 6b. The second fuel cell stack 6b is thus at least partially and/or temporarily supplied with waste gas from the first fuel cell stack 6a. This makes it possible to dimension the compressor 8b and the humidifier 10b which are assigned to the second fuel cell stack 6b to be smaller than the compressor 8a and the humidifier 10a which are assigned to the first fuel cell stack 6a. Furthermore, the arrangement illustrated in FIG. 1 enables the first fuel cell stack 6a and the second fuel cell stack 6b to be operated independently of one another.

Figure 2:
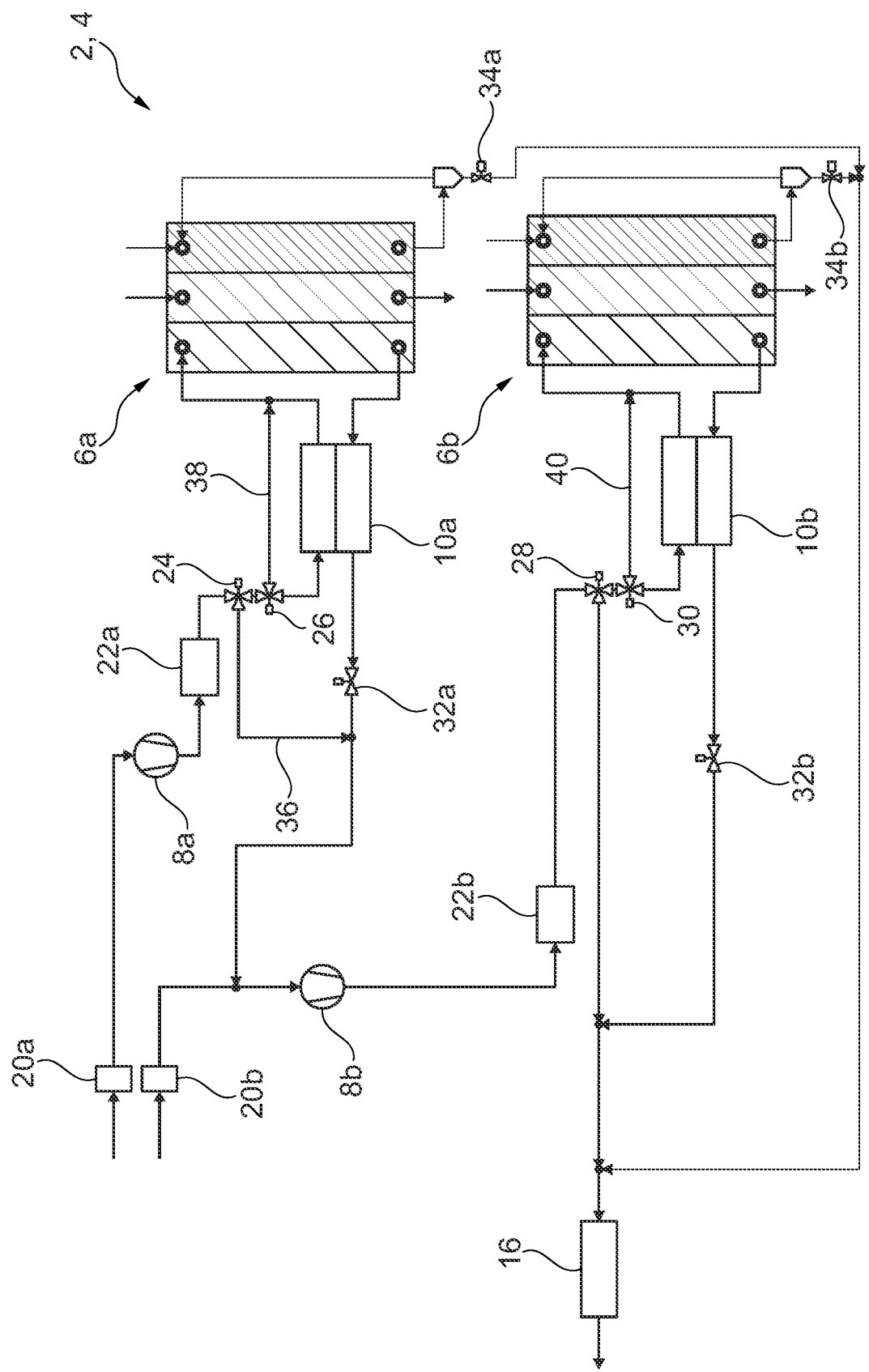
FIG. 2 shows, in schematic representation, another embodiment of a fuel cell assembly for a fuel cell motor vehicle.

The embodiment illustrated in FIG. 2 differs from the embodiment illustrated in FIG. 1 in that the first bypass 36 opens downstream of the filter 20a and upstream of the compressor 8a into the supply line which connects the filter 20b, the compressor 8b and the water-cooled cooler 22b. The extracted waste gas flows through the humidifier 10a, the throttle valve 32a, the compressor 8b, the water-cooled cooler 22b, and the further valves 28, 30, and is then passed via the humidifier 10b and/or directly into the second fuel cell stack 6b. The second fuel cell stack 6b is thus at least partially and/or temporarily supplied with waste gas from the first fuel cell stack 6a. This too makes it possible to dimension the compressor 8b and the humidifier 10b which are assigned to the second fuel cell stack 6b to be smaller than the compressor 8a and the humidifier 10a which are assigned to the first fuel cell stack 6a. Furthermore, the arrangement illustrated in FIG. 2 enables the first fuel cell stack 6a and the second fuel cell stack 6b to be operated independently of one another.

Figure 3:
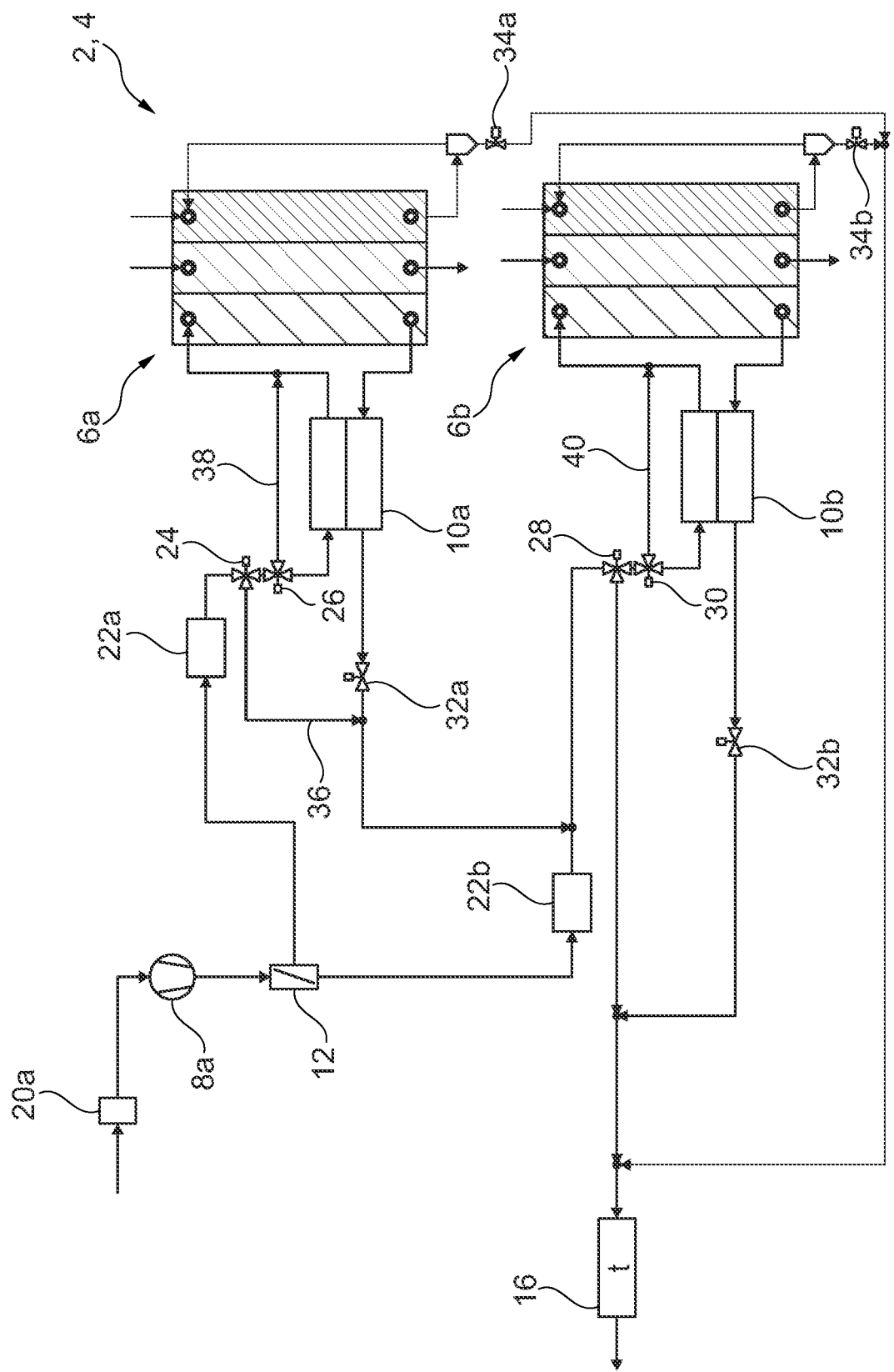
FIG. 3 shows, in schematic representation, another embodiment of a fuel cell assembly for a fuel cell motor vehicle.

The embodiment illustrated in FIG. 3 differs from the embodiment illustrated in FIG. 1 in that only one filter 20a and one compressor 8a are provided for supplying the two fuel cell stacks 6a and 6b. Downstream of the compressor 8a, a pressure distribution valve 12 having a first outlet and a second outlet is provided, wherein the first outlet is connected to the water-cooled cooler 22a and the second outlet is connected to the water-cooled cooler 22b. Similar to the embodiment of FIG. 1, the extracted waste gas flows through the humidifier 10a, the throttle valve 32a, and the further valves 28, 30, and is then passed via the humidifier 10b and/or directly into the second fuel cell stack 6b. The second fuel cell stack 6b is thus at least partially and/or temporarily supplied with waste gas from the first fuel cell stack 6a, and only a single compressor 8a is required.

Figure 4:
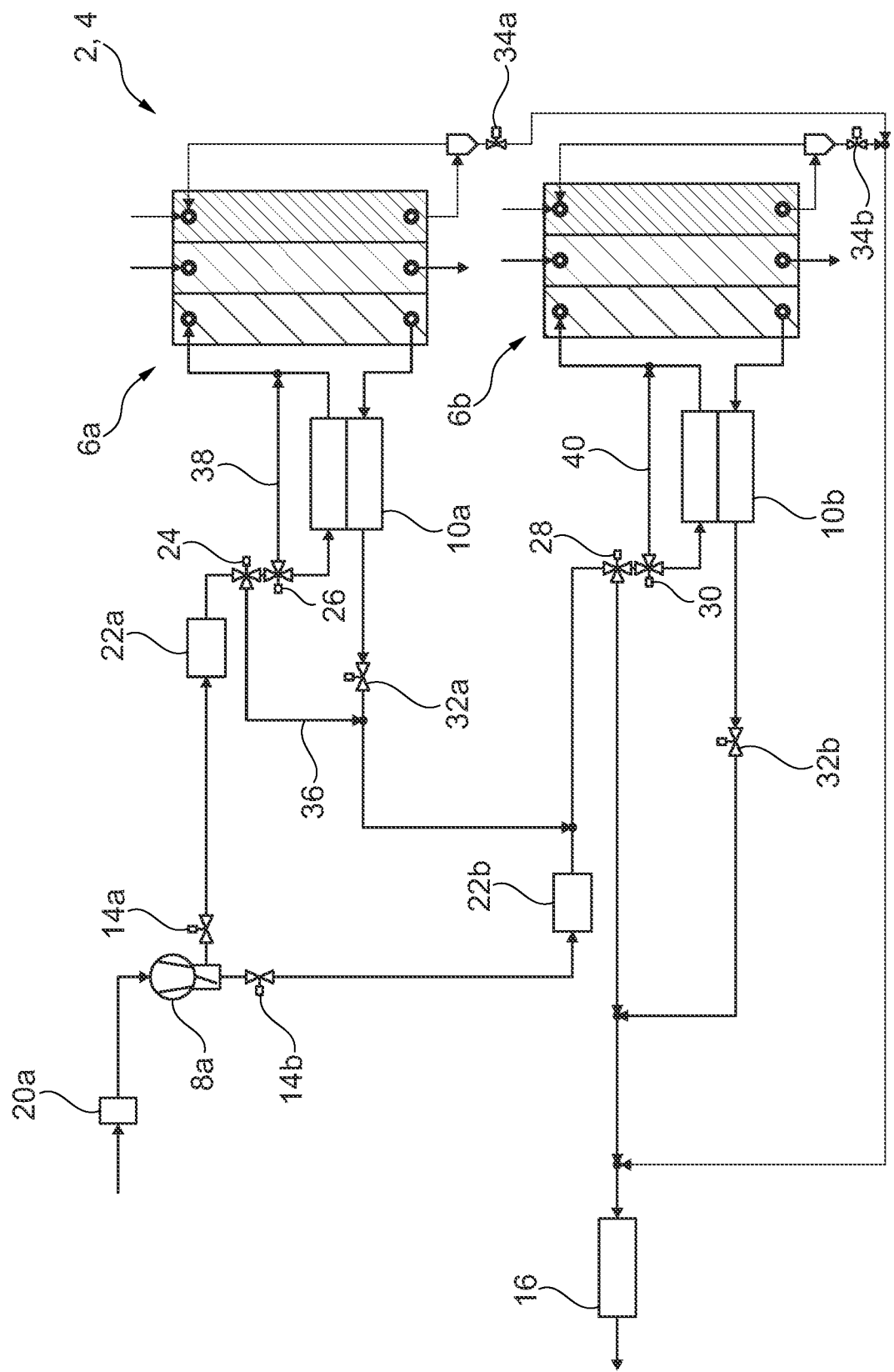
FIG. 4 shows, in schematic representation, another embodiment of a fuel cell assembly for a fuel cell motor vehicle.

The embodiment illustrated in FIG. 4 differs from the embodiment illustrated in FIG. 3 in that, instead of the pressure distribution valve 12 of FIG. 3, a compressor 8a which has two pressure outlets, each of the outlets being assigned a throttle valve 14a, 14b is provided in FIG. 4. The second fuel cell stack 6b is thus at least partially and/or temporarily supplied with waste gas from the first fuel cell stack 6a, and likewise only one compressor 8a is required.

Figure 5:
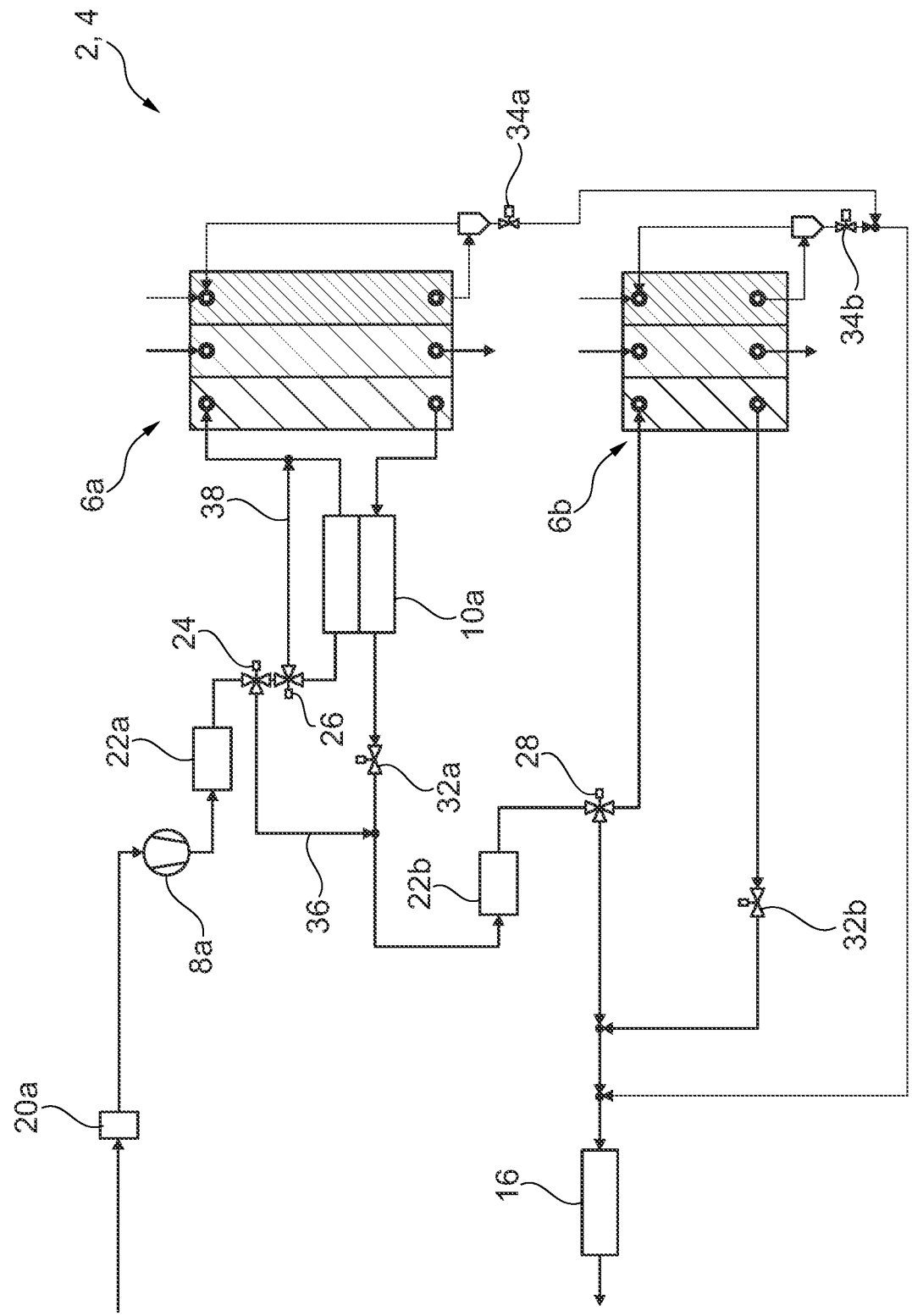
FIG. 5 shows, in schematic representation, another embodiment of a fuel cell assembly for a fuel cell motor vehicle.

The embodiment illustrated in FIG. 5 differs from the embodiments illustrated in FIGS. 1 to 4 in that the first fuel cell stack 6a and the second fuel cell stack 6b are of different sizes. The first fuel cell stack 6a is larger than the second fuel cell stack 6b. The embodiment illustrated in FIG. 5 furthermore differs from the embodiments illustrated in FIGS. 1 and 2 in that only a single filter 20a and a single compressor 8a as well as just one humidifier 10a are provided for supplying the two fuel cell stacks 6a and 6b. The extracted waste gas flows through the humidifier 10a, the throttle valve 32a, and the further valve 28 directly into the second fuel cell stack 6b. The arrangement illustrated in FIG. 5 does not enable the first fuel cell stack 6a and the second fuel cell stack 6b to be operated independently of one another.

Figure 6:
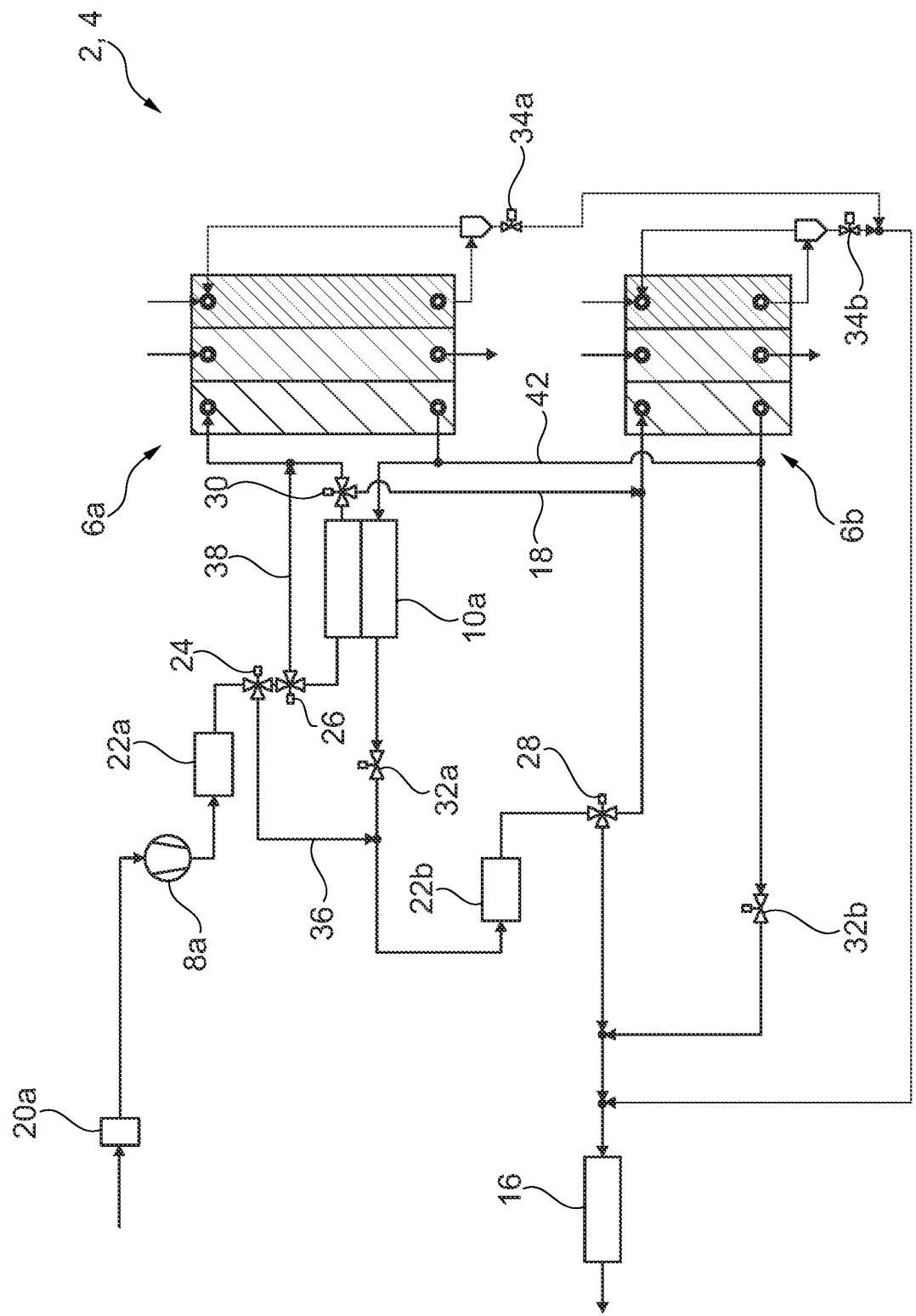
FIG. 6 shows, in schematic representation, another embodiment of a fuel cell assembly for a fuel cell motor vehicle.

The embodiment illustrated in FIG. 6 differs from the embodiment illustrated in FIG. 5 in that the valve 30 is used to open a further bypass 42, which enables the second fuel cell stack 6b to be supplied directly with compressed air, which is provided by the compressor 8a. Furthermore, this enables waste gas from the second fuel cell stack 6b to be passed together with waste gas from the first fuel cell stack 6a through a humidifier 10a which is assigned to the first fuel cell stack 6a. Thus, the bypass 42 returns humid waste gas from the second fuel cell stack 6b to the humidifier 10a in order to humidify the inlet air if this is necessary. Furthermore, a further line 18 can be used to supply the second fuel cell stack 6b with fresh air. Via the line 42, humid waste gas can be returned from the second fuel cell stack 6b to the humidifier 10a. This arrangement enables the first fuel cell stack 6a and the second fuel cell stack 6b to be operated independently of one another. The pressure can be controlled by means of the throttle valve 32a. The extracted waste gas flows through the humidifier 10a, the throttle valve 32a, the water-cooled cooler 32a and the further valve 28 into the second fuel cell stack 6b. The arrangement illustrated in FIG. 6 enables the first fuel cell stack 6a and the second fuel cell stack 6b to be operated independently of one another.

With arrangements according to representative embodiments as described above, it is possible to provide a fuel cell assembly 4 which requires approximately 20% less operating energy, for example.

While representative embodiments are described above, it is not intended that these embodiments describe all possible forms of the claimed subject matter. The words used in the specification are words of description rather than limitation, and it is understood that various changes may be made without departing from the teachings of the disclosure and the claimed subject matter. Additionally, the features of various implementing embodiments may be combined to form further embodiments of the invention.

What is claimed is:

1. A fuel cell system comprising:
   a first fuel cell stack;
   a second fuel cell stack;
   a first compressor disposed upstream of the first fuel cell stack and having an outlet coupled to an inlet of the first fuel cell stack and coupled to an inlet of the second fuel cell stack;
   a pressure distribution valve having an inlet coupled to the outlet of the first compressor, a first outlet coupled to the inlet of the first fuel cell stack, and a second outlet coupled to the inlet of the second fuel cell stack; and
   a throttle valve operable to route waste gas from the first fuel cell stack to an input of the second fuel cell stack.

2. The fuel cell system of claim 1 further comprising:
   a second compressor disposed upstream of the second fuel cell stack and having an outlet coupled to an inlet of the second fuel cell stack.

3. The fuel cell system of claim 2 wherein the throttle valve is operable to route waste gas from the first fuel cell stack to an input of the second compressor.

4. The fuel cell system of claim 2 wherein the throttle valve is operable to route waste gas from the first fuel cell stack to the output of the second compressor.

5. A fuel cell system comprising:
   a first fuel cell stack;
   a second fuel cell stack;
   a compressor disposed upstream of the first fuel cell stack and having a first outlet coupled to an inlet of the first fuel cell stack and a second outlet coupled to the inlet of the second fuel cell stack; and
   a throttle valve operable to route waste gas from the first fuel cell stack to the inlet of the second fuel stack.

6. The fuel cell system of claim 1 further comprising a humidifier disposed between the compressor and the first fuel cell stack, the humidifier configured to transfer water vapor between the waste gas of the first fuel cell stack and the inlet of the first fuel cell stack.

7. The fuel cell system of claim 6 further comprising a second humidifier configured to transfer water vapor between the waste gas of the second fuel cell stack and the inlet of the second fuel cell stack.

8. The fuel cell system of claim 6 wherein an outlet of the second fuel cell stack is coupled to the humidifier and wherein the humidifier is configured to transfer water vapor between the waste gas of the second fuel cell stack and the inlet of the second fuel cell stack.

* * * * *